United States Patent
Hwang et al.

(10) Patent No.: US 11,983,071 B2
(45) Date of Patent: May 14, 2024

(54) ERROR CORRECTION CODE CIRCUIT AND SEMICONDUCTOR APPARATUS INCLUDING THE SAME

(71) Applicant: SK hynix Inc., Icheon-si (KR)

(72) Inventors: Seon Woo Hwang, Icheon-si (KR); Seong Jin Kim, Icheon-si (KR); Jung Hwan Ji, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 161 days.

(21) Appl. No.: 17/882,123

(22) Filed: Aug. 5, 2022

(65) Prior Publication Data
US 2023/0273860 A1    Aug. 31, 2023

(30) Foreign Application Priority Data
Feb. 28, 2022    (KR) .......................... 10-2022-0025976

(51) Int. Cl.
*G06F 11/10*    (2006.01)
(52) U.S. Cl.
CPC ................... *G06F 11/108* (2013.01)
(58) Field of Classification Search
None
See application file for complete search history.

(56) References Cited

U.S. PATENT DOCUMENTS

| 5,610,929 | A | * | 3/1997 | Yamamoto | ......... | G11B 20/1866 |
| | | | | | | 714/761 |
| 2018/0196713 | A1 | * | 7/2018 | Lee | ......................... | G11C 29/46 |
| 2021/0141687 | A1 | | 5/2021 | Song | | |
| 2021/0193245 | A1 | | 6/2021 | Ryu et al. | | |

FOREIGN PATENT DOCUMENTS

WO    WO-2010004664 A1 *    1/2010

* cited by examiner

*Primary Examiner* — Guerrier Merant
(74) *Attorney, Agent, or Firm* — WILLIAM PARK & ASSOCIATES LTD.

(57) ABSTRACT

The present technology may include an error correction code engine configured to generate a parity bit and syndrome information by performing an operation according to operation source data, and a data processing circuit configured to simultaneously output the parity bit and first delay data, which is generated by delaying input data by a first time according to a write operation, simultaneously output the syndrome information and second delay data, which is generated by delaying input data by a second time according to a read operation, and to share substantially the same signal path in generating the first delay data and in generating the second delay data.

22 Claims, 8 Drawing Sheets

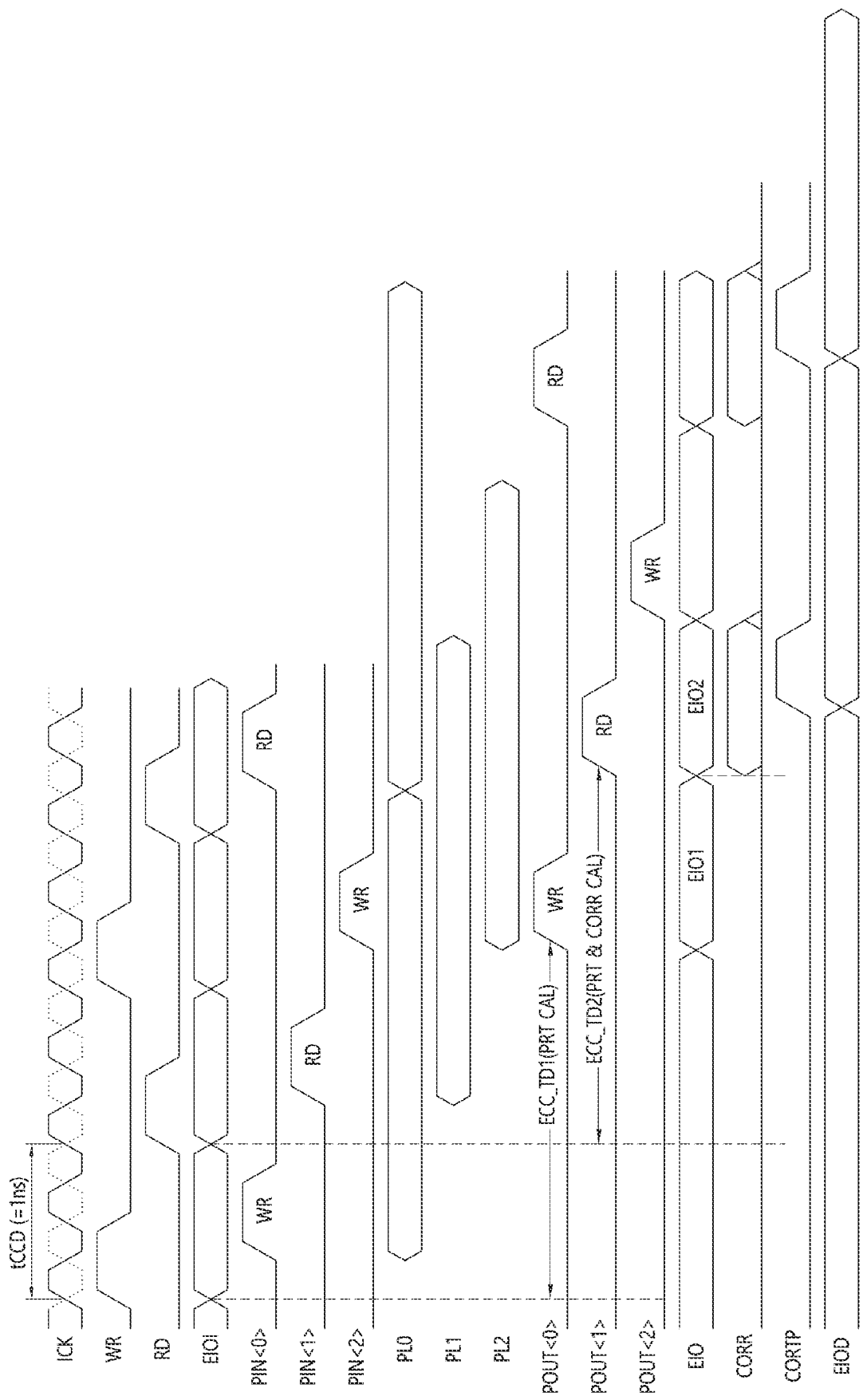

ERROR CORRECTION CODE CIRCUIT AND SEMICONDUCTOR APPARATUS INCLUDING THE SAME

CROSS-REFERENCES TO RELATED APPLICATION

The present application claims priority under 35 U.S.C. § 119(a) to Korean application number 10-2022-0025976, filed on Feb. 28, 2022, in the Korean Intellectual Property Office, which is incorporated herein by reference in its entirety.

BACKGROUND

1. Technical Field

Various embodiments generally relate to a semiconductor circuit, and particularly, to an error correction code circuit and a semiconductor apparatus including the same.

2. Related Art

In a semiconductor apparatus, for example, a semiconductor memory apparatus, time that is required for specifications related to various operations is reduced due to an increase in an operating speed, resulting in an increase in a bit error rate. Therefore, the semiconductor apparatus has an error correction code (ECC) function for correcting a bit error.

SUMMARY

An error correction code circuit in accordance with an embodiment of the present disclosure may include: an error correction code engine configured to generate a parity bit and syndrome information by performing an operation according to operation source data; and a data processing circuit configured to simultaneously output the parity bit and first delay data, which is generated by delaying input data by a first time according to a write operation, to simultaneously output the syndrome information and second delay data, which is generated by delaying input data according by a second time to a read operation, and to share substantially the same signal path in generating the first delay data and in generating the second delay data.

A semiconductor apparatus in accordance with an embodiment of the present disclosure may include: a write path configured to write, in a memory area, data and a parity bit that are provided from sources outside of the write path during a write operation; a read path configured to correct an error that is included in data, which is read from the memory area during a read operation, according to syndrome information and configured to output the error-corrected data; and an error correction code circuit configured to generate the parity bit and the syndrome information by performing an operation on operation source data to simultaneously output the parity bit and first delay data, which is generated by delaying input data by a first time according to the write operation, to the write path, to simultaneously output the syndrome information and second delay data, which is generated by delaying input data by a second time according to the read operation, to the read path, and to share substantially the same signal path in generating the first delay data and in generating the second delay data.

A semiconductor apparatus in accordance with an embodiment of the present disclosure may include: a write path configured to write, in a memory area, data and a parity bit that are provided from sources outside of the write path during a write operation; a read path configured to correct an error that is included in data, which is read from the memory area during a read operation, according to syndrome information and configured to output the error-corrected data; and an error correction code engine configured to generate the parity bit and the syndrome information by performing an operation on operation source data; and a data processing circuit configured to simultaneously output the parity bit and first delay data, which is generated by delaying input data by a first time according to the write operation, to the write path, to simultaneously output the syndrome information and second delay data, which is generated by delaying input data by a second time according to the read operation, to the read path, and to share substantially the same signal path in generating the first delay data and in generating the second delay data.

BRIEF DESCRIPTION OF THE DRAWINGS

FIG. 8 is an operation timing diagram of the semiconductor apparatus 200 including the error correction code circuit in accordance with an embodiment of the present disclosure.

DETAILED DESCRIPTION

Hereinafter, embodiments of the present disclosure will be described in more detail with reference to the accompanying drawings.

Various embodiments are directed to providing an error correction code circuit capable of improving the reliability of an ECC operation and reducing current consumption due to the ECC operation, and a semiconductor apparatus including the same.

Figure 1:
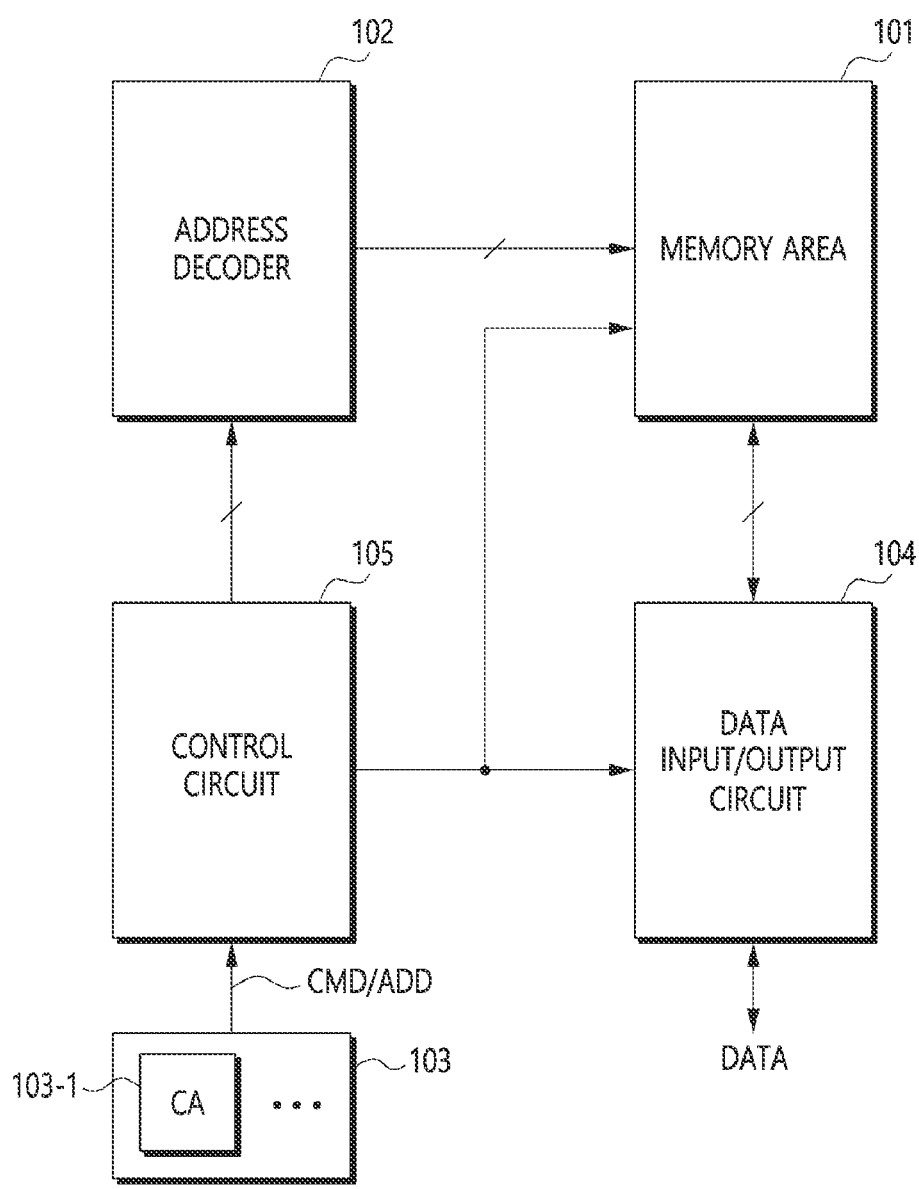
FIG. 1 is a diagram illustrating the configuration of a semiconductor apparatus 100 in accordance with an embodiment of the present disclosure.

FIG. 1 is a diagram illustrating the configuration of a semiconductor apparatus 100 in accordance with an embodiment of the present disclosure.

Referring to FIG. 1, the semiconductor apparatus 100 may include a memory area 101, an address decoder 102, a pin array 103, a data input/output circuit 104, and a control circuit 105.

The memory area 101 may include a plurality of memory cells, and the plurality of memory cells may each include at least one of a volatile memory and a nonvolatile memory. Examples of the volatile memory may include a static RAM (SRAM), a dynamic RAM (SRAM), and a synchronous DRAM (SDRAM), and examples of the nonvolatile memory may include a read only memory (ROM), a programmable ROM (PROM), an electrically erasable and programmable ROM (EEPROM), an electrically programmable ROM (EPROM), a flash memory, a phase-change RAM (PRAM), a magnetic RAM (MRAM), a resistive RAM (RRAM), and a ferroelectric RAM (FRAM). During a read operation of the semiconductor apparatus 100, data that is stored in the memory area 101 may be output. During a write operation of the semiconductor apparatus 100, data that is input from outside of the semiconductor apparatus 100 may be stored in the memory area 101. The memory cells of the memory area 101 may be divided into a plurality of unit memory areas, for example, a plurality of memory banks. The plurality of memory banks may be grouped into, for example, bank groups, and may be controlled according to the read operation and the write operation of the semiconductor apparatus 100, The address decoder 102 may be connected to the control circuit 105 and the memory area 101. The address decoder 102 may decode an address signal that is provided by the control circuit 105 and may access the memory area 101 according to the decoding result. Examples of the address signal that is provided by the control circuit 105 may include a row address signal and a column address signal. The row address signal may include an address for selectively activating a plurality of bank groups and an address for selectively activating a plurality of memory banks. The address for selectively activating the plurality of bank groups may be referred to as a bank group address, and the address for selectively activating the plurality of memory banks may be referred to as a bank address The pin array 103 may include command and address integrated pins (CA) 103-1. A command CMD and an external address signal ADD may be sequentially input through the command and address integrated pins (CA) 103-1 at a predetermined timing.

The data input/output circuit 104 may be connected to the memory area 101. The data input/output circuit 104 may exchange data within the semiconductor apparatus 100 or with an external device The data input/output circuit 104 may include a data input buffer, a data output buffer, a data input/output pad, and the like. The data input/output circuit 104 may include an error correction code circuit (hereinafter, an ECC circuit). The ECC circuit may include a data processing circuit for delaying data that is input during a write operation and data that is input during a read operation by using a signal path that is shared by the write operation and the read operation of the semiconductor apparatus 100 while an ECC-related operation is being performed. The data processing circuit may be connected in common to a write path and a read path of the semiconductor apparatus 100 and may delay data that passes through the write path and data that passes through the read path while the ECC-related operation is being performed.

The control circuit 105 may be connected to the memory area 101, the address decoder 102, and the data input/output circuit 104. The control circuit 105 may perform the read operation, the write operation, and a control operation related to address processing of the semiconductor apparatus 100. The control circuit 105 may receive a command and an external address from an external source through the command and address integrated pins (CA).

Figure 2:
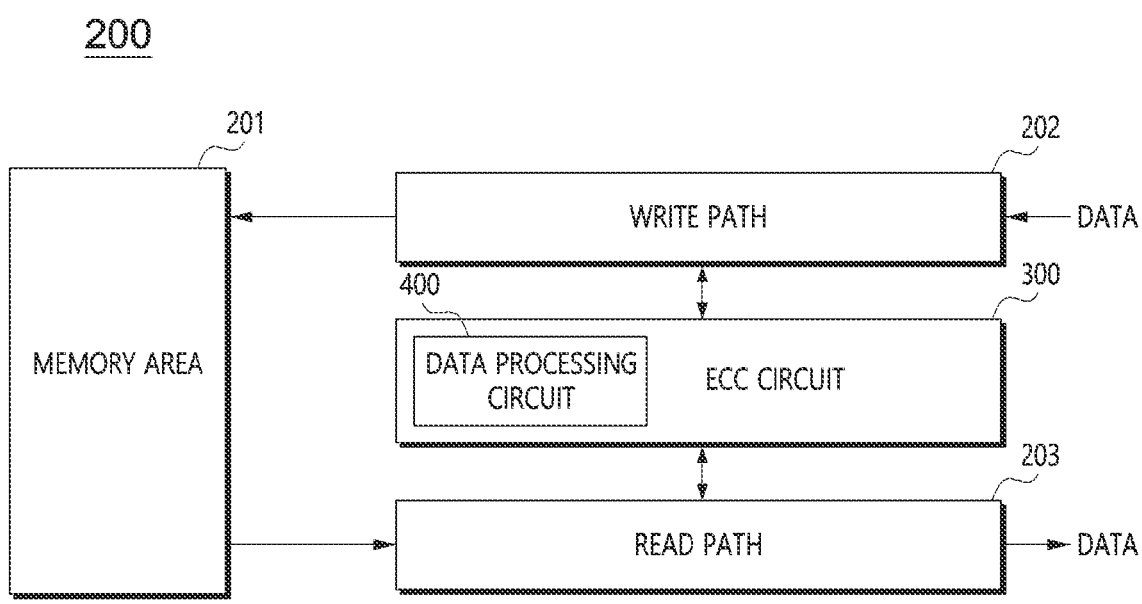
FIG. 2 is a diagram illustrating the configuration of a semiconductor apparatus 200 including an error correction code circuit in accordance with an embodiment of the present disclosure.

FIG. 2 is a diagram illustrating the configuration of a semiconductor apparatus 200 including an error correction code circuit in accordance with an embodiment of the present disclosure.

Referring to FIG. 2, the semiconductor apparatus 200 may include a write path 202, a read path 203, and an ECC circuit 300, The write path 202 may be configured to write data provided from sources outside of the write path 202 (hereinafter, write data) and a parity bit during the write operation of the semiconductor apparatus 200, in a memory area 201.

The read path 203 may be configured to correct an error that is included in data (hereinafter, read data), which is read from the memory area 201 during the read operation of the semiconductor apparatus 100, according to syndrome information, and may be configured to output the error-corrected read data.

The ECC circuit 300 may be configured to generate a parity bit and syndrome information by performing an ECC operation on input data. The ECC circuit 300 may be configured to delay data that is input during a write operation by a first time and transfer the delayed data to the write path 202 and may be configured to delay data that is input during a read operation by a second time and transfer the delayed data to the read path 203. The first time may be set to match time that is required for a parity bit operation, and the second time may be set to match time that is required for a parity bit operation and a syndrome information operation. Since the second time is set to match the time including the additional operation, that is, the syndrome information operation, the second time may be longer than the first time.

The ECC circuit 300 may include a data processing circuit 400 configured to delay data that is input during the write operation for the first time and transfer the delayed data to the write path 202, and delay data that is input during the read operation for the second time and transfer the delayed data to the read path 203.

Figure 3:
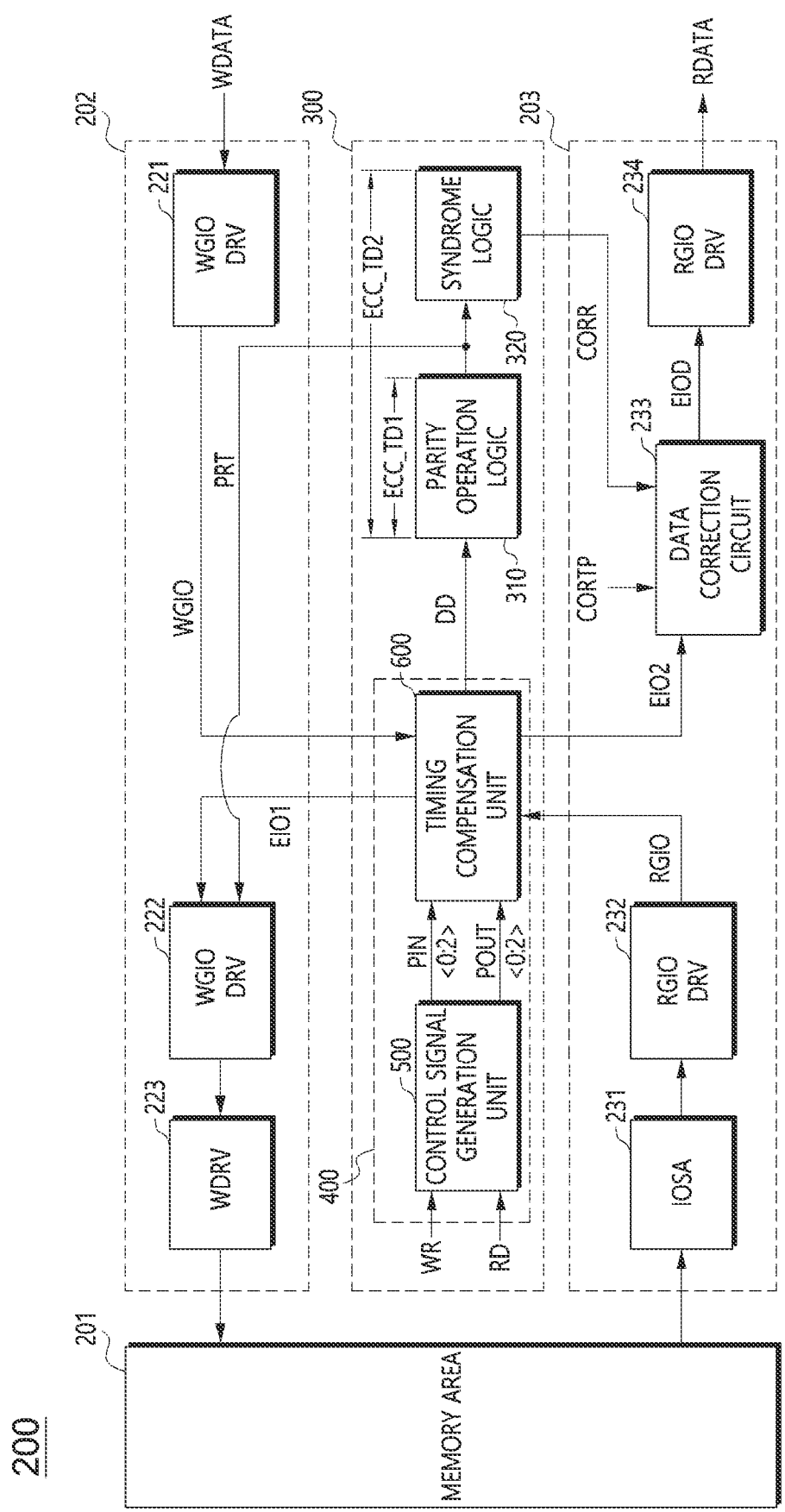
FIG. 3 is a diagram illustrating a detailed configuration of the semiconductor apparatus 200 including the error correction code circuit in accordance with an embodiment of the present disclosure.

FIG. 3 is a diagram illustrating a detailed configuration of the semiconductor apparatus 200 including the error correction code circuit in accordance with an embodiment of the present disclosure.

Referring to FIG. 3, the write path 202 may include a first line driver (WGIO DRV) 221, a first global line WGIO, a second line driver (WGIO DRV) 222, and a write driver (WDRV) 223.

The WGIO DRV 221 may be configured to drive write data and transmit the driven write data to the first global line WGIO.

The first global line WGIO may be configured to transmit the output of the WGIO DRV 221 to the ECC circuit 300.

The WGIO DRV 222 may be configured to drive and output first delay data EIO1 and a parity bit PRT.

The WDRV 223 may be configured to drive the output of the WGIO DRV 222 and write the driven output in the memory area 201.

The read path 203 may include a sense/amplifier circuit (IOSA) 231, a first line driver (RGIO DRV) 232, a second global line RGIO, a data correction circuit 233, and a second line driver (RGIO DRV) 234.

In the embodiment of the present disclosure, the data correction circuit 233 is included in the read path. However, this is merely an embodiment and the data correction circuit 233 may be configured in a different circuit. For example, the data correction circuit 233 may be included as a component of the ECC circuit 300.

The IOSA 231 may be configured to output read data that is generated by sensing and amplifying data corresponding to a read operation-related address and a corresponding parity bit in the memory area 201.

The RGIO DRV 232 may be configured to drive the output of the IOSA 231 and transmit the driven output to the second global line RGIO.

The second global line RGIO may be configured to transmit the output of the RGIO DRV 232 to the ECC circuit 300.

The data correction circuit 233 may be configured to correct an error that is included in second delay data EIO2 according to syndrome information CORR and configured to output error-corrected read data EIOD. The data correction circuit 233 may correct the error that is included in the second delay data EIO2 by inverting the second delay data EIO2 according to the syndrome information CORR. For example, when the second delay data EIO2 includes n-bit normal data and m-bit parity bit, the syndrome information CORR may be n+m bits, which corresponds to the respective bits of delay data EIO, and the data correction circuit 233 may perform error correction by inverting a logic level of a bit (or bits) of the second delay data EIO2, which corresponds to a bit (or bits), among the n+m bits of the syndrome information CORR, having a logic high value. The data correction circuit 233 may output the error-corrected read data EIOD in response to an output control signal CORTP. The output control signal CORTP may be generated by the data correction circuit 233 itself and may be activated in consideration of the margin of time that is required to perform an error correction operation from the input time of the error-corrected read data EIOD or the input time of the syndrome information CORR.

Hereinafter, the first delay data EIO1 and the second delay data EIO2 may be collectively referred to as delay data EIO, and for convenience of description, delay data EIO during the write operation of the semiconductor apparatus will be referred to as first delay data EIO1, and delay data EIO during the read operation of the semiconductor apparatus will be referred to as second delay data EIO2, The RGIO DRV 234 may be configured to drive and output the output of the data correction circuit 233.

Lengths of the first global line WGIO and the second global line RGIO may be longer than those of other interconnections in the semiconductor apparatus 200. Accordingly, the embodiment of the present disclosure is merely an example in which the drivers 221, 222, 232, and 234 are connected on the first global line WGIO and the second global line RGIO to serve as repeaters for reinforcing the intensity of a signal that is transmitted through the first global line WGIO and the second global line RGIO so that a receiving side may recognize the intensity of the signal, and the drivers 221, 222, 232, and 234 are not essential components. The drivers 221, 222, 232, and 234 may be deleted according to PVT (process, voltage, temperature) conditions including the lengths of the first global line WGIO and the second global line RGIO and the intensity of a signal transmitted through the first global line WGIO and the second global line RGIO. When the drivers 221, 222, 232, and 234 are not included, the WDRV 223 may directly drive the first delay data EIO1 and the parity bit PRT and may write the driven first delay data EIO1 and parity bit PRT in the memory area 201, and the IOSA 231 may directly transmit, to the second global line RGIO, read data that is generated by sensing and amplifying data that corresponds to a read operation-related address and a corresponding parity bit in the memory area 201.

The ECC circuit 300 may include an ECC engine and the data processing circuit 400. The ECC engine may be configured to perform an ECC operation, that is, the generation of the parity bit PRT, the generation of the syndrome information CORR, and the like, by using a low density parity check (LDPC) code, a BCH (Bose, Chaudhri, Hocquenghem) code, a turbo code, a Reed-Solomon code, a convolution code, a recursive systematic code, or coded modulation, such as trellis-coded modulation (TCM) and block coded modulation (BCM).

The ECC engine may include a parity operation logic 310 and a syndrome logic 320. In an embodiment, the parity operation logic 310 and the syndrome logic 320 may be implemented as hardware, software, or a combination of hardware and software. The parity operation logic 310 may be configured to generate the parity bit PRT by performing an ECC operation according to operation source data DD. The parity operation logic 310 may be configured to transfer the parity bit PRT and the operation source data DD to the syndrome logic 320. The syndrome logic 320 may generate the syndrome information CORR by performing an ECC operation according to the parity bit PRT and the operation source data DD. In such a case, the time that is required for the operation of the parity bit PRT will be referred to as a first time ECC_TD1, and the time that is required for the operation of the parity bit PRT and the syndrome information CORR will be referred to as a second time ECC_TD2. Since relatively more information is calculated for the second time ECC_TD2 compared to the first time ECC_TD1, the second time ECC_TD2 may be longer than the first time ECC_TD1.

The data processing circuit 400 may be configured to generate the first delay data EIO1 by delaying input data in response to a write command WR and configured to generate the second delay data EIO2 by delaying input data in response to a read command RD. The data processing circuit 400 may be configured to simultaneously output the parity bit PRT and first delay data EIO1, the first delay data EIO1 generated by delaying input data, that is, data that is loaded on the first global line WGIO, by the first time ECC_TD1, in response to the write command WR. The data processing circuit 400 may be configured to simultaneously output the syndrome information CORR and the second delay data EIO2 by delaying input data, that is, data that is loaded on the second global line RGIO, by the second time ECC_TD2, in response to the read command RD. The data processing circuit 400 may share the same signal path to generate the first delay data EIO1 and to generate the second delay data EIO2. The data processing circuit 400 may include a control signal generation unit 500 and a timing compensation unit 600.

The control signal generation unit 500 may generate input control signals PIN<0:2> and output control signals POUT<0:2> in response to the write command WR and the read command RD.

The taming compensation unit 600 may generate the first delay data EIO1 by delaying input data through a pipe processing method according to the input control signals PIN<0:2> and the output control signals POUT<0:2> in response to the write command WR. The timing compensation unit 600 may generate the second delay data EIO2 by delaying input data through a pipe processing method according to the input control signals PIN<0:2> and the output control signals POUT<0:2> in response to the read command RD.

The timing compensation unit 600 may be configured to transfer input data to the parity operation logic 310 as the operation source data DD during the write operation of the semiconductor apparatus 200. The timing compensation unit 600 may be configured to transfer input data including a parity bit to the parity operation logic 310 as the operation source data DD during the read operation of the semiconductor apparatus 100.

Figure 4:
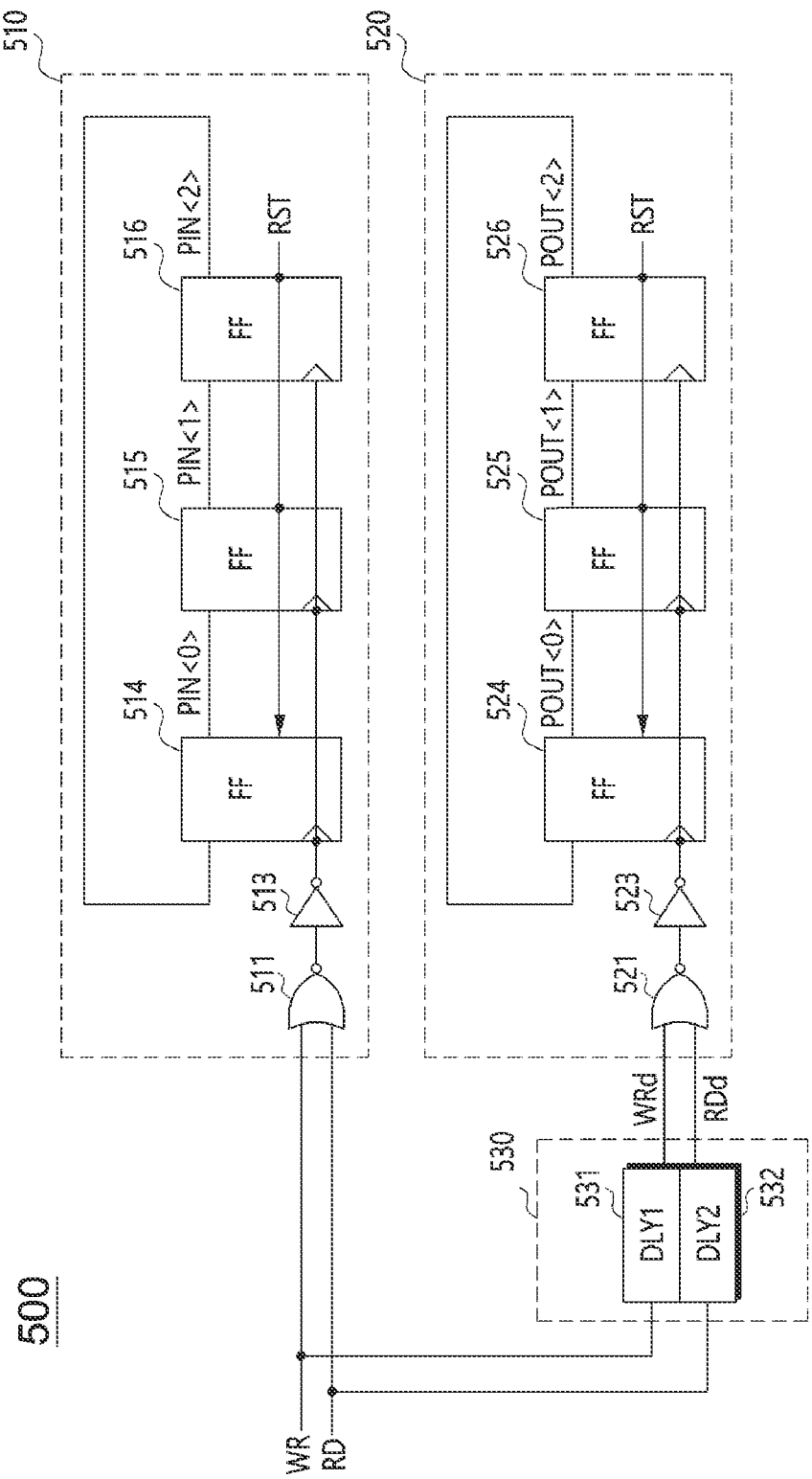
FIG. 4 is a diagram illustrating the configuration of a control signal generation unit 500 of FIG. 3.

FIG. 4 is a diagram illustrating the configuration of the control signal generation unit 500 of FIG. 3.

Referring to FIG. 4, the control signal generation unit 500 may include a first shift register 510, a second shift register 520, and a delay circuit 530.

The first shift register 510 may be configured to generate the input control signals PIN<0:2> in response to the write command WR and the read command RD. The first shift register 510 may include first and second logic gates 511 and 513 and first to third flip-flops 514 to 516. The first and second logic gates 511 and 513 may perform an OR logic operation on the write command WR and the read command RD and may output the 'OR'ed command. The first to third flip-flops 514 to 516 may receive the output of the second logic gate 513 through dock terminals thereof, perform an operation of shifting the levels of output terminals whenever the levels of the clock terminals transition, and output operation results as the input control signals PIN<0:2>. The first to third flip-flops 514 to 516 may initialize the levels of the output terminals in response to a reset signal RST. For example, as the reset signal RST is input at a high level, the first to third flip-flops 514 to 516 may initialize all of the input control signals PIN<0:2> to a low level.

The second shift register 520 may be configured to generate the output control signals POUT<0:2> in response to a delayed write command WRd and a delayed read command RDd. The second shift register 520 may include first and second logic gates 521 and 523 and first to third flip-flops 524 to 526. The first and second logic gates 521 and 523 may perform an OR logic operation on the write command WR and the read command RD and may output the 'OR'ed command. The first to third flip-flops 524 to 526 may receive the output of the second logic gate 523 through dock terminals thereof, perform an operation of shifting the levels of output terminals whenever the levels of the dock terminals transition, and output operation results as the input control signals PIN<0:2>. The first to third flip-flops 524 to 526 may initialize the levels of the output terminals in response to the reset signal RST. For example, as the reset signal RST is input at a high level, the first to third flip-flops 524 to 526 may initialize all of the input control signals PIN<0:2> to a low level.

The delay circuit 530 may be configured to delay the write command WR and the read command RD by different set times and may output the delayed write command WRd and read command RDd. The delay circuit 530 may include a first delay 531 (DLY1) and a second delay 532 (DLY2). The DLY1 may output the delayed write command WRd by delaying the write command WR by the first time ECC_TD1. The DLY2 may output the delayed read command RDd by delaying the read command RD by the second time ECC_TD2.

Figure 5:
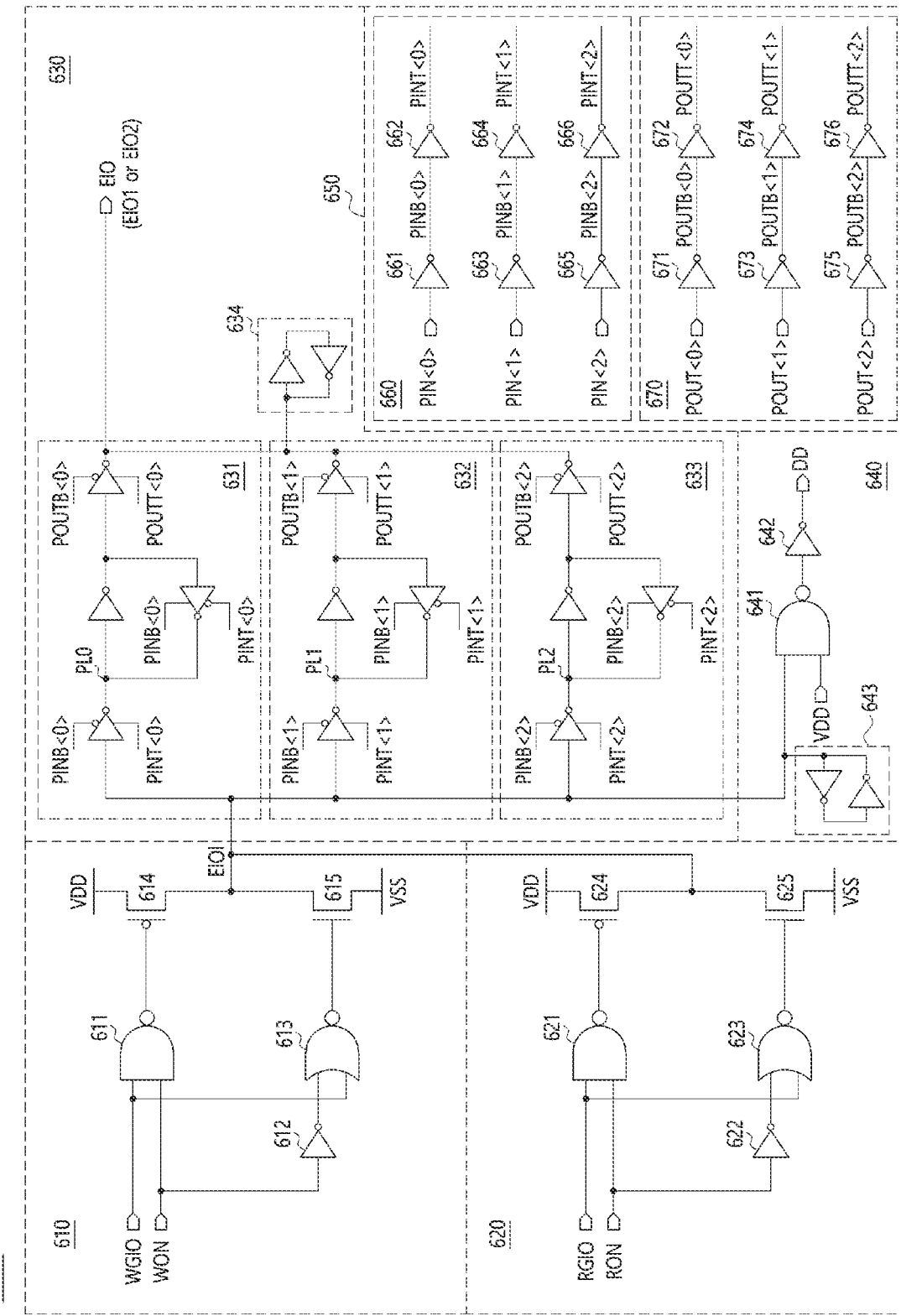
FIG. 5 is a diagram illustrating the configuration of a timing compensation unit 600 of FIG. 3.

FIG. 5 is a diagram illustrating the configuration of the timing compensation unit 600 of FIG. 3.

Referring to FIG. 5, the timing compensation unit 600 may include a write driving section 610, a read driving section 620, a pipe register 630, an operation source data processing section 640, and a pipe control section 650.

The write driving section 610 may generate internal data EIOI by driving data that is loaded on the first global line WGIO in response to a write enable signal WON. The write enable signal WON may be generated based on the write command WR and may have an activation period according to timing specifications related to the write operation of the semiconductor apparatus. The write driving section 610 may include a plurality of logic gates 611 to 613 and drivers 614 and 615. The first logic gate 611 may perform a NAND logic operation on a logic level of the write enable signal WON and a logic level of the first global line WGIO to output the 'NAND'ed signal. The second logic gate 612 may invert the logic level of the write enable signal WON and output the write enable signal WON having an inverted logic level. The third logic gate 613 may perform a NOR logic operation on the output of the second logic gate 612 and the logic level of the first global line WGIO to output the 'NOR'ed signal. The drivers 614 and 615 may drive the internal data EIOI to a level of a power supply voltage VDD or a ground voltage VSS according to the output of the first logic gate 611 and the output of the third logic gate 613.

The read driving section 620 may generate the internal data EIOI by driving data that is loaded on the second global line RGIO in response to a read enable signal RON. The read enable signal RON may be generated based on the read command RD and may have an activation period according to timing specifications related to the read operation of the semiconductor apparatus. The read driving section 620 may include a plurality of logic gates 621 to 623 and drivers 624 and 625. The first logic gate 621 may perform a NAND logic operation on a logic level of the read enable signal RON and a logic level of the second global line RGIO and output the 'NAND'ed signal. The second logic gate 622 may invert the logic level of the read enable signal RON and output the read enable signal RON having an inverted logic level. The third logic gate 623 may perform a NOR logic operation on the output of the second logic gate 622 and the logic level of the second global line RGIO and output the 'NOR'ed signal. The drivers 624 and 625 may drive the internal data EIOI to the level of the power supply voltage VDD or the ground voltage VSS according to the output of the first logic gate 621 and the output of the third logic gate 623.

The pipe register 630 may have a multi-stage pipe structure and may pipe the internal data EIOI, which are sequentially input in response to the write command WR and the read command RD, in response to a plurality of control signals PINB<0:2>, PINT<0:2>, POUTB<0:2>, and POUTT<0:2>, and may output the piped data as the delay data EIO. The embodiment of the present disclosure is an example in which the pipe register 630 is configured as three-stage pipes 631 to 633. The first-stage pipe 631 may receive and latch the internal data EIOI in response to PINB<0> and PINT<0>, among the plurality of control signals PINB<0:2>, PINT<0:2>, POUTB<0:2>, and POUTT<0:2>, and may output the latched data as the delay data EIO in response to POUTB<0> and POUTT<0>. The second-stage pipe 632 may receive and latch the internal data EIOI in response to PINB<1> and PINT<1>, and output the latched data as the delay data EIO in response to POUTB<1> and POUTT<1>. The third-stage pipe 633 may receive and latch the internal data EIOI in response to PINB<2> and PINT<2>, and may output the latched data as the delay data EIO in response to POUTB<2> and POUTT<2>. The pipe register 630 may further include a latch 634 for substantially maintaining the level of the delay data EIO until new delay data EIO is output.

The operation source data processing section 640 may buffer the internal data EIOI and output the buffered data as the operation source data DD. The operation source data processing section 640 may include a plurality of logic gates 641 and 642 for buffering the internal data EIOI. The plurality of logic gates 641 and 642 may output results, which are obtained by performing an AND logic operation on the internal data EIOI and the level of the power supply voltage VDD, as the operation source data DD. The operation source data processing section 640 may further include a latch 643 for substantially maintaining the level of the internal data EIOI until new internal data EIOI is output.

The pipe control section 650 may generate the plurality of control signals PINB<0:2>, PINT<0:2>, POUTB<0:2>, and POUTT<0:2> in response to the input control signals PIN<0:2> and the output control signals POUT<0:2>. The pipe control section 650 may include a first control part 660 and a second control part 670. The first control part 660 may generate the plurality of control signals PINB<0:2> and PINT<0:2> by inverting the input control signals PIN<0:2> through a plurality of inverters 661 to 666. The second control part 670 may generate the plurality of control signals POUTB<0:2> and POUTT<0:2> by inverting the output control signals POUT<0:2> through a plurality of inverters 671 to 676.

Figure 6:
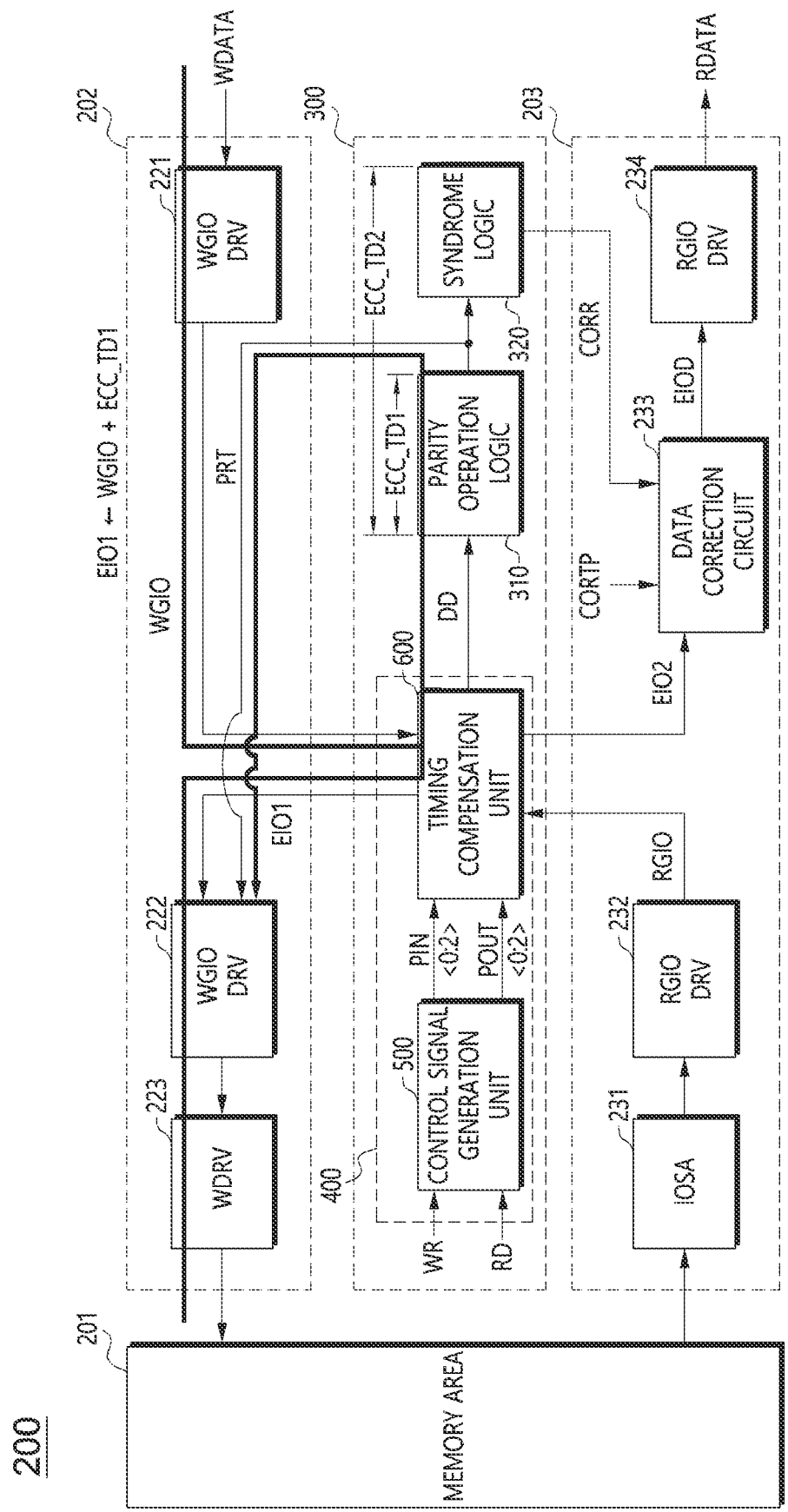
FIG. 6 is a diagram for explaining an ECC-associated write operation of the semiconductor apparatus 200 including the error correction code circuit in accordance with an embodiment of the present disclosure.
Figure 7:
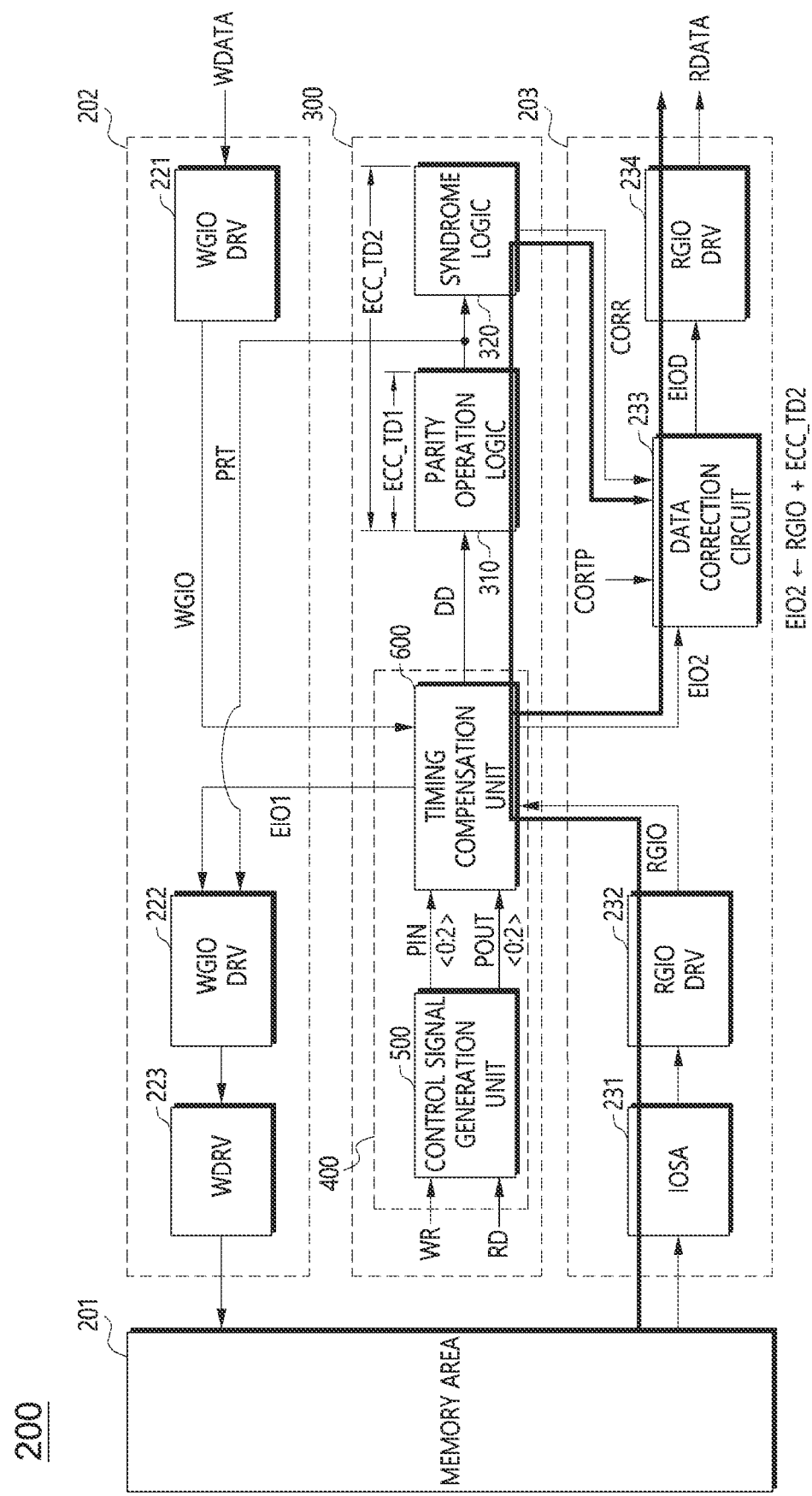
FIG. 7 is a diagram for explaining an ECC-associated read operation of the semiconductor apparatus 200 including the error correction code circuit in accordance with an embodiment of the present disclosure.

FIG. 6 is a diagram for explaining an ECC-associated write operation of the semiconductor apparatus 200 including the error correction code circuit in accordance with an embodiment of the present disclosure, FIG. 7 is a diagram for explaining an ECC-associated read operation of the semiconductor apparatus 200 including the error correction code circuit in accordance with an embodiment of the present disclosure, and FIG. 8 is an operation timing diagram of the semiconductor apparatus 200 including the error correction code circuit in accordance with an embodiment of the present disclosure.

Hereinafter, a write operation associated with an ECC operation will be described with reference to FIG. 6 and FIG. 8.

Data WDATA that is input from an external device in response to the write command WR may be latched as the internal data EIOI of the timing compensation unit 600 via the WGIO DRV 221 and the first global line WGIO and may be provided to the parity operation logic 310 as the operation source data DD at the same time.

The parity operation logic 310 may generate the parity bit PRT according to the operation source data DD.

The internal data EIOI may be latched in a node PL0 of the first-stage pipe 631 of the pipe register 630 by the input control signal PIN<0> as shown in FIG. 5.

The internal data EIOI that is latched in the node PL0 may be output as the first delay data EIO1 in response to the output control signal POUT<0> as shown in FIG. 5.

The first delay data EIO1 may be delayed by the first time ECC_TD1 based on the internal data EIOI, that is, the time that is required for the operation of the parity bit PRT.

The first delay data EIO1 and the parity bit PRT may be written in the memory area 201 via the WGIO DRV 222 and the WDRV 223 at substantially the same time.

Hereinafter, a read operation associated with an ECC operation will be described with reference to FIG. 7 and FIG. 8.

An embodiment will be described below in which the read command RD is input at an interval of tCCD (CAS to CAS delay) after the write command WR is input.

Data that is output from the memory area 201 in response to the read command RD may be latched as the internal data EIOI of the timing compensation unit 600 via the IOSA 231 and the RGIO DRV 232 and may be provided to the parity operation logic 310 as the operation source data DD at the same time.

The parity operation logic 310 may generate the parity bit PRT according to the operation source data DD.

The syndrome logic 320 may generate the syndrome information CORR according to the parity bit PRT and the operation source data DD.

The internal data EIOI may be latched in a node PL1 of the first-stage pipe 631 of the pipe register 630 by the input control signal PIN<1>.

The internal data EIOI that is latched in the node PL1 may be output as the second delay data EIO2 in response to the output control signal POUT<1>.

The second delay data EIO2 may be delayed by the second time ECC_TD2 based on the internal data EIOI, that is, the time that is required for the operation of the parity bit PRT and the operation of the syndrome information CORR.

The second delay data EIO2 and the syndrome information CORR may be provided to the data correction circuit 233 at substantially the same time.

The data correction circuit 233 may correct an error that is included in the second delay data EIO2 according to the syndrome information CORR and may output the error-corrected read data EIOD in response to the output control signal CORTP.

The error-corrected read data EIOD may be output to an external device as read data RDATA via the RGIO DRV 234.

A person skilled in the art to which the present disclosure pertains can understand that the present disclosure may be carried out in other specific forms without changing its technical spirit or essential features. Therefore, it should be understood that the embodiments described above are illustrative in all respects, not limitative. The scope of the present disclosure is defined by the claims to be described below rather than the detailed description, and it should be construed that the meaning and scope of the claims and all modifications or modified forms derived from the equivalent concept thereof are included in the scope of the present disclosure.

What is claimed is:

1. An error correction code circuit comprising:
   an error correction code engine configured to generate a parity bit and syndrome information by performing an operation according to operation source data; and
   a data processing circuit configured to simultaneously output the parity bit and first delay data, which is generated by delaying input data by a first time according to a write operation, simultaneously output the syndrome information and second delay data, which is generated by delaying input data by a second time according to a read operation, and share substantially the same signal path in generating the first delay data and in generating the second delay data.

2. The error correction code circuit according to claim 1, wherein the first time is set to match a time that is required for an operation of the parity bit, and
   wherein the second time is set to match a time that is required for an operation of the parity bit and an operation of the syndrome information.

3. The error correction code circuit according to claim 1, wherein the error correction code engine comprises:
   a parity operation logic configured to generate the parity bit by performing an operation according to the operation source data; and
   a syndrome logic configured to generate the syndrome information by performing an operation according to the parity bit and the operation source data.

4. The error correction code circuit according to claim 1, wherein the data processing circuit comprises:

a control signal generation unit configured to generate input control signals and output control signals in response to a write command and a read command, respectively; and a timing compensation unit configured to generate the first delay data by delaying input data according to the write operation through a pipe processing method in response to the input control signals and the output control signals and configured to generate the second delay data by delaying input data according to the read operation through a pipe processing method in response to the input control signals and the output control signals.

5. The error correction code circuit according to claim 4, wherein the control signal generation unit is configured to generate the output control signals in response to a delayed write command and a delayed read command that are generated by delaying the write command and the read command, respectively, by different times.

6. The error correction code circuit according to claim 4, wherein the control signal generation unit comprises:
   a first shift register configured to generate the input control signals in response to the write command and the read command;
   a second shift register configured to generate the output control signals in response to a delayed write command and a delayed read command; and
   a delay circuit configured to output a signal, which is obtained by delaying the write command by the first time, as the delayed write command, and to output a signal, which is obtained by delaying the read command by the second time, as the delayed read command.

7. The error correction code circuit according to claim 4, wherein the timing compensation unit is configured to provide the error correction code engine with the input data according to the write operation and the input data according to the read operation as the operation source data.

8. The error correction code circuit according to claim 4, wherein the timing compensation unit comprises:
   a write driving section configured to generate internal data by driving the input data according to the write operation in response to a write enable signal;
   a read driving section configured to generate the internal data by driving the input data according to the read operation in response to a read enable signal;
   a pipe register configured to pipe internal data according to the write operation to output the piped data as the first delay data and configured to pipe internal data according to the read operation to output the piped data as the second delay data; and
   an operation source data processing section configured to buffer the internal data according to the write operation and the internal data according to the read operation and configured to output the buffered data as the operation source data.

9. A semiconductor apparatus comprising:
   a write path configured to write, in a memory area, data and a parity bit during a write operation;
   a read path configured to correct an error that is included in data, which is read from the memory area during a read operation, according to syndrome information and configured to output the error-corrected data; and
   an error correction code circuit configured to generate the parity bit and the syndrome information by performing an operation on operation source data to simultaneously output the parity bit and first delay data, which is generated by delaying input data by a first time according to the write operation, to the write path, simultaneously output the syndrome information and second delay data, which is generated by delaying input data by a second time according to the read operation, to the read path, and share substantially the same signal path in generating the first delay data and in generating the second delay data.

10. The semiconductor apparatus according to claim 9, wherein the write path comprises:
    a first global line configured to transmit the data that is provided from the sources outside of the write path to the error correction code circuit;
    a line driver configured to drive and output the first delay data and the parity bit; and
    a write driver configured to drive an output of the line driver and write the driven output in the memory area.

11. The semiconductor apparatus according to claim 9, wherein the read path comprises:
    a sense/amplifier circuit configured to sense and amplify data that is output from the memory area and a corresponding parity bit and configured to output the amplified data;
    a line driver configured to drive an output of the sense/amplifier circuit and configured to output the driven output;
    a second global line configured to transmit the output of the line driver to the error correction code circuit; and
    a data correction circuit configured to correct an error that is included in the second delay data according to the syndrome information and configured to output the error-corrected data.

12. The semiconductor apparatus according to claim 9, wherein the first time is set to match a time that is required for an operation of the parity bit, and
    wherein the second time is set to match a time that is required for an operation of the parity bit and an operation of the syndrome information.

13. The semiconductor apparatus according to claim 9, wherein the error correction code circuit comprises:
    an error correction code engine configured to generate the parity bit and the syndrome information according to the operation source data;
    a control signal generation unit configured to generate input control signals and output control signals in response to a write command and a read command, respectively; and
    a timing compensation unit configured to generate the first delay data by delaying input data according to the write operation through a pipe processing method in response to the input control signals and the output control signals and configured to generate the second delay data by delaying input data according to the read operation through a pipe processing method in response to the input control signals and the output control signals.

14. The semiconductor apparatus according to claim 13, wherein the control signal generation unit is configured to generate the output control signals in response to a delayed write command and a delayed read command that are generated by delaying the write command and the read command, respectively, by different times.

15. The semiconductor apparatus according to claim 13, wherein the control signal generation unit comprises:
    a first shift register configured to generate the input control signals in response to the write command and the read command;

a second shift register configured to generate the output control signals in response to a delayed write command and a delayed read command; and a delay circuit configured to output a signal, which is obtained by delaying the write command by the first time, as the delayed write command, and to output a signal, which is obtained by delaying the read command by the second time, as the delayed read command.

16. The semiconductor apparatus according to claim 13, wherein the timing compensation unit is configured to provide the error correction code engine with the input data according to the write operation and the input data according to the read operation as the operation source data.

17. The semiconductor apparatus according to claim 13, wherein the timing compensation unit comprises:

a write driving section configured to generate internal data by driving the input data according to the write operation in response to a write enable signal;

a read driving section configured to generate the internal data by driving the input data according to the read operation in response to a read enable signal;

a pipe register configured to pipe internal data according to the write operation to output the piped data as the first delay data and configured to pipe internal data according to the read operation to output the piped data as the second delay data; and an operation source data processing section configured to buffer the internal data according to the write operation and the internal data according to the read operation and configured to output the buffered data as the operation source data.

18. A semiconductor apparatus comprising:

a write path configured to write, in a memory area, data and a parity bit that are provided from sources outside of the write path during a write operation;

a read path configured to correct an error that is included in data, which is read from the memory area during a read operation, according to syndrome information and configured to output the error-corrected data;

an error correction code engine configured to generate the parity bit and the syndrome information by performing an operation on operation source data; and a data processing circuit configured to simultaneously output the parity bit and first delay data, which is generated by delaying input data by a first time according to the write operation, to the write path, to simultaneously output the syndrome information and second delay data, which is generated by delaying input data by a second time according to the read operation, to the read path, and to share substantially the same signal path in generating the first delay data and in generating the second delay data.

19. The semiconductor apparatus according to claim 18, wherein the data processing circuit is configured to buffer the input data according to the write operation and the input data according to the read operation, and to output the buffered data as the operation source data.

20. The semiconductor apparatus according to claim 18, wherein the write path comprises:

a first global line configured to transmit the data that is provided from the sources outside of the write path during the write operation to the error correction code engine;

a line driver configured to drive and output the first delay data and the parity bit; and a write driver configured to drive an output of the line driver and write the driven output in the memory area.

21. The semiconductor apparatus according to claim 18, wherein the read path comprises:

a sense/amplifier circuit configured to sense and amplify data that is output from the memory area and a corresponding parity bit and configured to output the amplified data;

a line driver configured to drive an output of the sense/amplifier circuit and configured to output the driven output;

a second global line configured to transmit the output of the line driver to the error correction code engine; and a data correction circuit configured to correct an error that is included in the second delay data according to the syndrome information and configured to output the error-corrected data.

22. The semiconductor apparatus according to claim 18, wherein the data processing circuit comprises:

a control signal generation unit configured to generate input control signals in response to a write command and a read command, respectively, and configured to generate output control signals in response to a delayed write command and a delayed read command that are generated by delaying the write command and the read command, respectively, by different times, wherein the pipe register is configured to operate in response to the input control signals and the output control signals.

* * * * *